(12) United States Patent
Lee

(10) Patent No.: US 11,714,403 B2
(45) Date of Patent: Aug. 1, 2023

(54) METHOD FOR LEARNING AND DETECTING ABNORMAL PART OF DEVICE THROUGH ARTIFICIAL INTELLIGENCE

(71) Applicant: ITS CO., LTD., Ulsan (KR)

(72) Inventor: Young Kyu Lee, Ulsan (KR)

(73) Assignee: ITS CO., LTD., Ulsan (KR)

( * ) Notice: Subject to any disclaimer, the term of this patent is extended or adjusted under 35 U.S.C. 154(b) by 0 days.

(21) Appl. No.: 17/831,846

(22) Filed: Jun. 3, 2022

(65) Prior Publication Data

US 2022/0299987 A1 Sep. 22, 2022

Related U.S. Application Data

(63) Continuation of application No. PCT/KR2020/017523, filed on Dec. 3, 2020.

(30) Foreign Application Priority Data

Dec. 5, 2019 (KR) .......................... 10-2019-0161117

(51) Int. Cl.
*G05B 23/02* (2006.01)
*G06N 20/00* (2019.01)

(52) U.S. Cl.
CPC ..... *G05B 23/0254* (2013.01); *G05B 23/0283* (2013.01); *G06N 20/00* (2019.01); *G05B 2223/02* (2018.08)

(58) Field of Classification Search
None
See application file for complete search history.

(56) References Cited

U.S. PATENT DOCUMENTS

| 4,964,046 A | * | 10/1990 | Mehrgardt | ............. G06F 17/10 712/36 |
| 10,539,602 B2 | | 1/2020 | Thompson | |
| 10,699,553 B2 | | 6/2020 | Lee | |
| 10,706,709 B2 | | 7/2020 | Lee | |

(Continued)

FOREIGN PATENT DOCUMENTS

| KR | 100608235 B1 | 8/2006 |
| KR | 101643599 B1 | 7/2016 |

(Continued)

*Primary Examiner* — Mohammad Ali
*Assistant Examiner* — David Earl Ogg
(74) *Attorney, Agent, or Firm* — Lempia Summerfield Katz LLC

(57) ABSTRACT

A method for learning and detecting an abnormal part of a device through artificial intelligence comprises: an information collection step for collecting a current waveform of a current value that changes over time in a driving state of at least one device and collecting information about a faulty part of the device, together with current waveform information before a fault occurs in the device; a model setting step for learning, by a control unit, information collected in the information collection step and setting a reference model of a current waveform for each faulty part of the device; and a detection step for, when an abnormal symptom of the device is detected in a real-time driving state, comparing, by the control unit, a real-time current waveform of the device and the reference model, and detecting and providing an abnormal part regarding the abnormal symptom of the device.

2 Claims, 4 Drawing Sheets

(56) References Cited

U.S. PATENT DOCUMENTS

Figure 1:
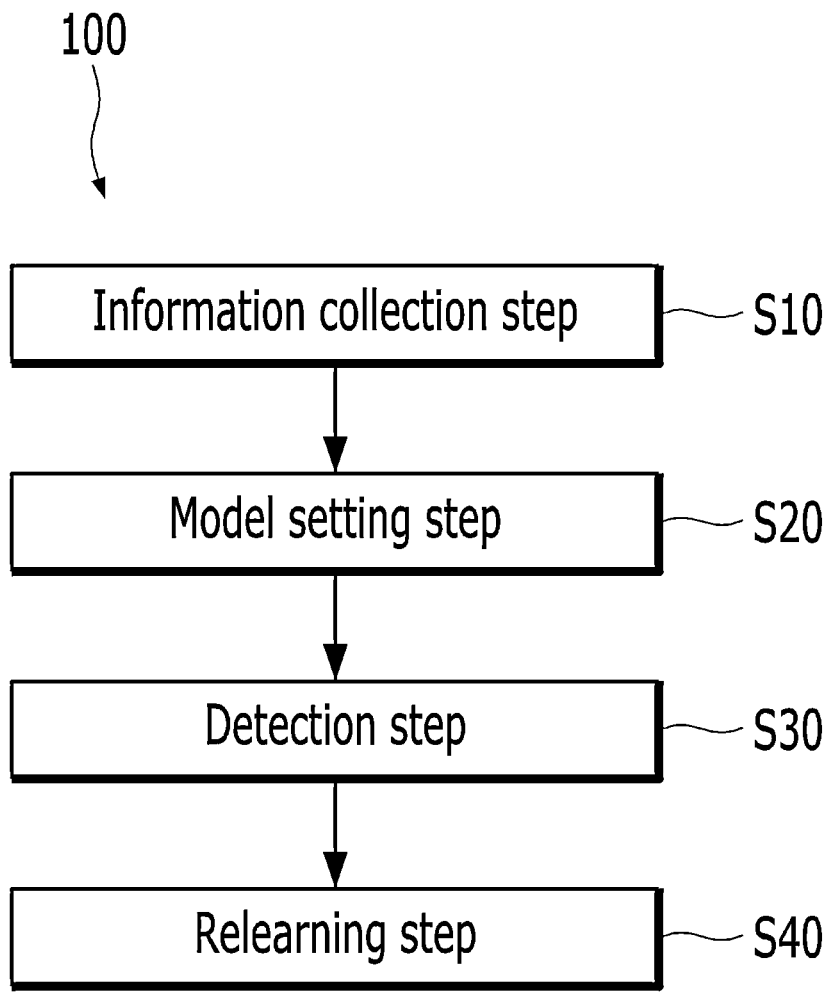

| | | |
|---|---|---|
| 10,732,619 B2 | 8/2020 | Lee |
| 2017/0285086 A1 | 10/2017 | Thompson |
| 2018/0174067 A1* | 6/2018 | Spiro ................. G05B 23/0237 |
| 2018/0203440 A1* | 7/2018 | Lee ................... G05B 23/0259 |
| 2018/0264613 A1* | 9/2018 | Tamai .................... G06N 3/045 |
| 2019/0196461 A1* | 6/2019 | Saigal ................ G06F 11/0793 |
| 2019/0304286 A1 | 10/2019 | Lee |
| 2019/0304287 A1 | 10/2019 | Lee |
| 2020/0198128 A1* | 6/2020 | Hatanaka ............. G05B 23/024 |

FOREIGN PATENT DOCUMENTS

| | | |
|---|---|---|
| KR | 101857393 B1 | 6/2018 |
| KR | 101865086 B1 | 6/2018 |
| KR | 101862218 B1 | 7/2018 |
| KR | 101893746 B1 | 8/2018 |
| KR | 101893744 B1 | 9/2018 |
| KR | 101893745 B1 | 10/2018 |
| KR | 101955678 B1 | 3/2019 |
| KR | 102039742 B1 | 11/2019 |
| KR | 102039743 B1 | 11/2019 |

\* cited by examiner

METHOD FOR LEARNING AND DETECTING ABNORMAL PART OF DEVICE THROUGH ARTIFICIAL INTELLIGENCE

CROSS-REFERENCE TO RELATED APPLICATIONS

This application is a continuation of International Patent Application No. PCT/KR2020/017523, filed Dec. 3, 2020, which claims priority to Korean Patent Application 10-2019-0161117, filed Dec. 5, 2019, the entirety of each of which is incorporated herein by reference.

FIELD

The present disclosure relates to a method for learning and detecting an abnormal part of a device through artificial intelligence. More particularly, the present disclosure relates to a method for learning and detecting an abnormal part of a device through artificial intelligence capable of allowing a manager to rapidly and accurately determine an abnormal part of the device and effectively deal with an abnormal symptom of the device to induce effective management of the device.

BACKGROUND

The statements in this section merely provide background information related to the present disclosure and may not constitute prior art.

In general, a stable operation of various devices used for automated processes of equipment is very important.

As an example, dozens or hundreds of devices are installed in facilities of large-scale production plants to continuously produce products while interlocking with each other. However, if any one of the plurality of devices fails, an enormous situation may occur in which the operation of the facilities is stopped as a whole.

At this time, due to the occurrence of down time caused by a fault of the device, huge losses may be inevitably caused by not only the repair cost of the device, but also operating costs wasted while the facilities are stopped and business effects.

According to recent data from the Ministry of Employment and Labor and the Korea Occupational Safety and Management Agency, casualties caused by the annual industrial safety accidents were collected at a total of 100,000, and a loss of 18 trillion won annually occurs when the casualties are converted into cost.

As a method for avoiding such unexpected downtime costs, it is urgent to introduce a predictive maintenance system.

Therefore, the present applicant has developed a technology for "a precision predictive maintenance method of a driving unit" that induces predictive maintenance of the driving unit by detecting an abnormal symptom of the driving unit before a fault occurs, and then the applicant has registered the technology as follows.

However, the "precision predictive maintenance method of the driving unit" developed by the present applicant detects the abnormal symptom of the driving unit but cannot accurately determine a part where the abnormal symptom has occurred. As a result, there was a problem that in addition to having somewhat inconvenience to be applied and used in the field, the application versatility of the technology was somewhat lowered due to such inconvenience.

Accordingly, there are problems that it is required that an expert resides in the field to diagnose and deal with an abnormal part of the device based on the abnormal symptom of the device, it takes a lot of time to diagnose an abnormal part by the expert, and the reliability of the diagnosis result is somewhat low, so that it is difficult to diagnose and repair the device smoothly.

SUMMARY

The present disclosure provides a method for learning and detecting an abnormal part of a device through artificial intelligence capable of allowing a manager to rapidly and accurately determine an abnormal part of the device and effectively deal with an abnormal symptom of the device to induce effective management of the device. The method includes collecting, by a plurality of devices, a large amount of information matching faulty part information together with current waveform information before a fault occurs in the device. The method also includes constructing and forming, by a control unit, a reference model for each faulty part while learning the collected information based on deep learning. The method also includes detecting and providing the abnormal part where the abnormal symptom of the device occurs by comparing the current waveform of the device with the reference model when the abnormal symptom of the device is detected in a real-time driving state.

Further, the present disclosure provides a method for learning and detecting an abnormal part of a device through artificial intelligence capable of inducing stable operation and management of the device. The method includes allowing even beginners to easily recognize an abnormal part regarding the abnormal symptom of the device to flexibly cope with the abnormal symptom of the device.

Further, the present disclosure provides a method for learning and detecting an abnormal part of a device through artificial intelligence capable of strengthening the application versatility of a predictive maintenance method. The method also includes detecting and providing an abnormal part regarding an abnormal symptom of the device immediately when the abnormal symptom of the device is detected by grafting a technology of a conventional precision predictive maintenance method of a driving unit to supplement an insufficient technical part of the precision predictive maintenance method of the driving unit.

According to an aspect of the present disclosure, a method for learning and detecting an abnormal part of a device through artificial intelligence includes: an information collection step (S10) for collecting a current waveform of a current value that changes over time in a driving state of at least one device and collecting information about a faulty part of the device, together with current waveform information before a fault occurs in the device. The method also includes a model setting step (S20) for learning, by a control unit, information collected in the information collection step (S10) and setting a reference model of a current waveform for each faulty part of the device. The method also includes a detection step (S30) for, when an abnormal symptom of the device is detected in a real-time driving state, comparing, by the control unit, a real-time current waveform of the device and the reference model and detecting and providing an abnormal part regarding the abnormal symptom of the device.

Further, the control unit may learn an image of a current waveform over time based on deep learning to set a reference model of the current waveform for each faulty part of the device, and in the detection step (S30), provides a probability value for the detected abnormal part together to induce a manager to easily determine the abnormal part of the device.

Further, as the current waveform information collected in the information collection step (S10), at least one information on a current waveform for a driving period in which the device is driven, a time length of the current waveform, an average current of the current waveform, a peak current of the current waveform, and an integral area of the current waveform may be collected.

Further, the method may further include a relearning step (S40) for receiving, by the control unit, feedback on the detection result of the abnormal part regarding the abnormal symptom of the device presented in the detection step (S30) and relearning the detection result and improving the probability value for the detection information presented in the detection step (S30) to enhance the reliability of the detection information.

According to the present disclosure, in the method for learning and detecting the abnormal part of the device through the artificial intelligence, it is possible to allow a manager to rapidly and accurately determine an abnormal part of the device and effectively deal with an abnormal symptom of the device to induce effective management of the device. The method may include collecting a large amount of information matching faulty part information together with current waveform information before a fault occurs in a plurality of devices. The method may also include constructing and forming, by a control unit, a reference model for each faulty part while learning the collected information based on deep learning. The method may also include detecting and providing the abnormal part where the abnormal symptom of the device occurs by comparing the current waveform of the device with the reference model when the abnormal symptom of the device is detected in a real-time driving state.

Further, it is possible to induce stable operation and management of the device by allowing even beginners to easily recognize an abnormal part regarding the abnormal symptom of the device to flexibly cope with the abnormal symptom of the device.

Further, it is possible to strengthen the application versatility of a predictive maintenance method by detecting and providing an abnormal part regarding an abnormal symptom of the device immediately when the abnormal symptom of the device is detected by grafting a technology of a conventional precision predictive maintenance method of a driving unit to supplement an insufficient technical part of the precision predictive maintenance method of the driving unit.

DRAWINGS

Figure 2:
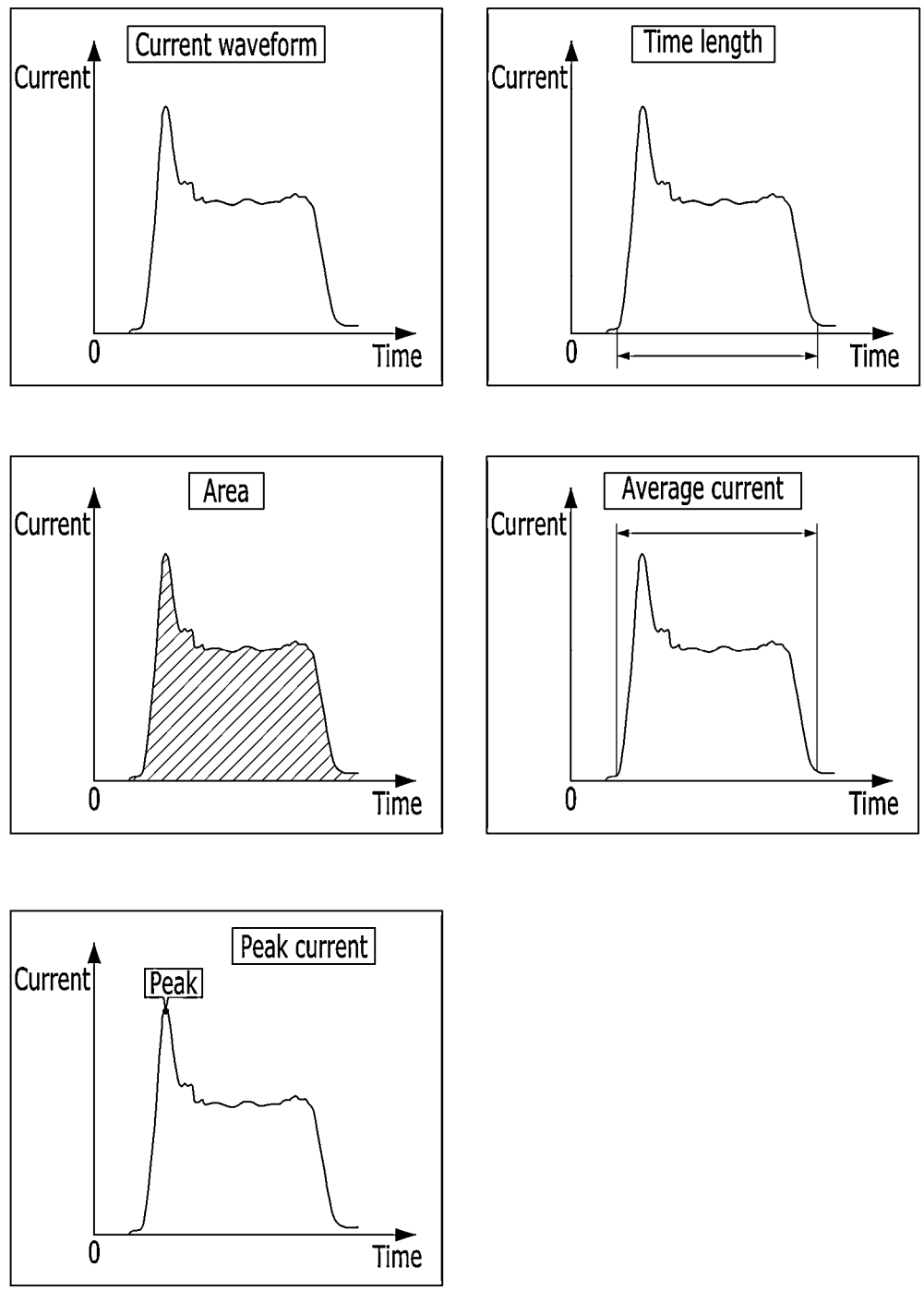
Figure 3:
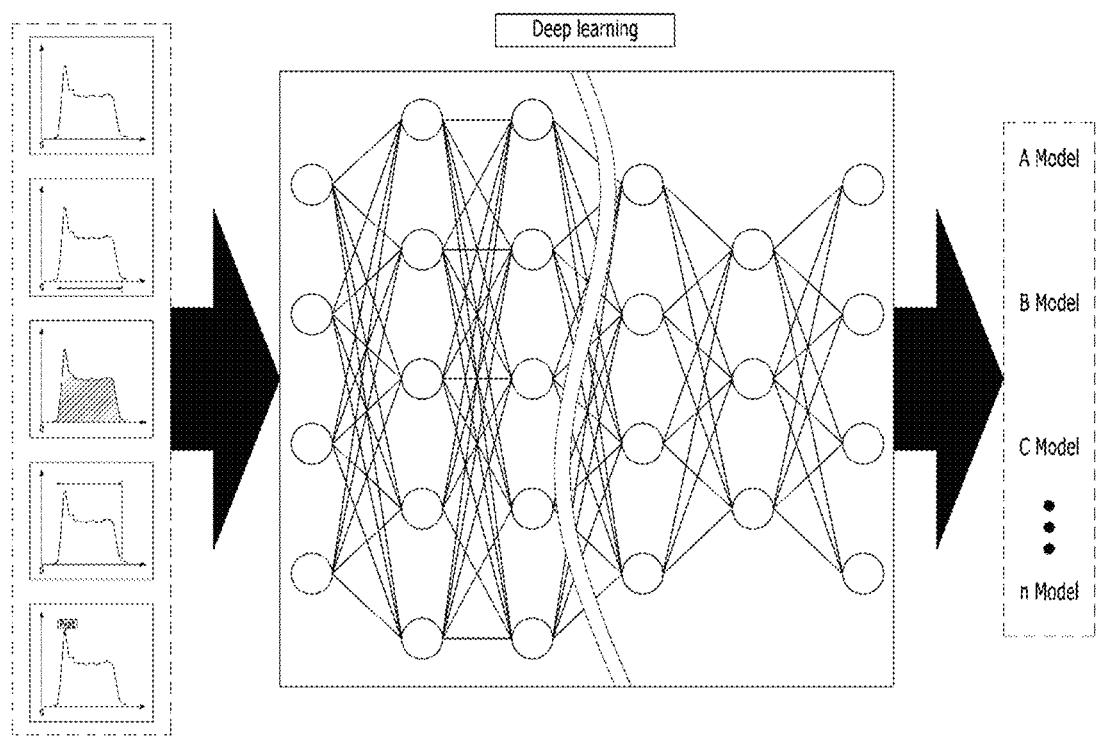
Figure 4:
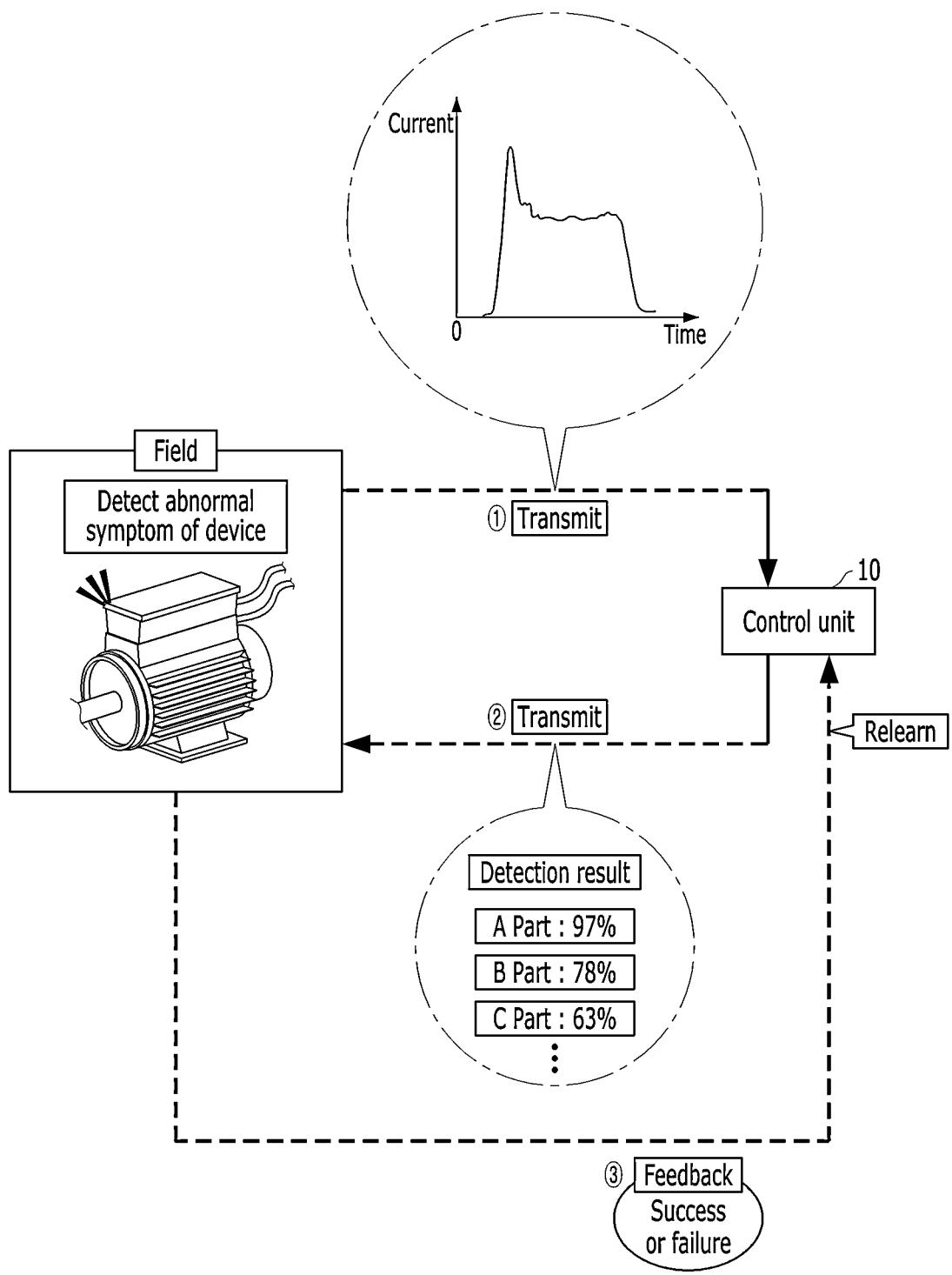

In order that the disclosure may be well understood, there will now be described various forms thereof, given by way of example, reference being made to the accompanying drawings, in which:

FIG. 1 is a block diagram of a method for learning and detecting an abnormal part of a device through artificial intelligence according to an embodiment of the present disclosure; and FIGS. 2-4 are diagrams for describing a method for learning and detecting an abnormal part of a device through artificial intelligence of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a method for learning and detecting an abnormal part of a device through artificial intelligence including an information collection step for collecting a current waveform of a current value that changes over time in a driving state of at least one device and collecting information about a faulty part of the device, together with current waveform information before a fault occurs in the device. The method also includes a model setting step for learning, by a control unit, information collected in the information collection step and setting a reference model of a current waveform for each faulty part of the device. The method also includes a detection step for, when an abnormal symptom of the device is detected in a real-time driving state, comparing, by the control unit, a real-time current waveform of the device and the reference model and detecting and providing an abnormal part regarding the abnormal symptom of the device.

A method for learning and detecting an abnormal part of a device through artificial intelligence according to an embodiment of the present disclosure is described in detail with reference to the accompanying drawings. The detailed description of publicly-known function and configuration that may make the gist of the present disclosure unnecessarily ambiguous has been omitted.

FIGS. 1-4 illustrate a method for learning and detecting an abnormal part of a device through artificial intelligence according to an embodiment of the present disclosure. FIG. 1 is a block diagram of a method for learning and detecting an abnormal part of a device through artificial intelligence according to an embodiment of the present disclosure. FIGS. 2-4 are diagrams for describing a method for learning and detecting an abnormal part of a device through artificial intelligence of the present disclosure, respectively.

As illustrated in the drawings, a method 100 for learning and detecting an abnormal part of a device through artificial intelligence according to an embodiment of the present disclosure includes an information collection step (S10), a model setting step (S20), and a detection step (S30).

As illustrated in FIG. 1, the information collection step (S10) is a step for collecting a current waveform of a current value that changes over time in a driving state of at least one device and collecting information about a faulty part of the device, together with current waveform information before a fault occurs in the device.

Here, the information on the current required to drive the device may be collected by various sensors that measure current values, the information about the faulty part may be collected by an operator (manager) at a field where the device is installed, and the collected information may be transmitted to a control unit 10 to be described below via a wired/wireless communication network.

Further, as illustrated in FIG. 2, as the current waveform information collected in the information collection step (S10), at least one information on a current waveform for a driving period in which the device is driven, a time length of the current waveform of a driving period, an average current of the current waveform, a peak current of the current waveform, and an integral area of the current waveform may be collected.

Here, the peak current of the current waveform means a value having the largest current value in the current waveform.

As described above, the various types of information collected in the information collection step (S10) are learned by the control unit 10 in the model setting step (S20) to be described below and become an important basis for setting a reference model for the faulty part.

As illustrated in FIG. 1, the model setting step (S20) is a step for learning, by the control unit 10, information collected in the information collection step (S10) and setting a reference model of a current waveform for each faulty part of the device.

In other words, as illustrated in FIG. 3, the control unit 10 learns the various types of information collected in the information collection step S10 to set and construct a reference model of the current waveform for each faulty part based on the learned information. However, due to the feature of deep learning, the information of the current waveform for one faulty part may require at least several hundreds to at most several thousands and tens of thousands of pieces of information. As such information is abundant, the accuracy of detecting the abnormal part of the device through the reference model set and constructed in the detection step (S30) to be described below may be increased.

Here, the control unit 10 may learn the information by various well-known deep learning methods and, for example, may learn the information by selectively applying methods such as VGG16, VGG19, ResNet50, and Inception V3.

As illustrated in FIG. 1, the detection step (S30) is a step for, when an abnormal symptom of the device is detected in a real-time driving state, comparing, by the control unit 10, a real-time current waveform of the device and the reference model and detecting and providing an abnormal part regarding the abnormal symptom of the device.

In other words, as illustrated in FIG. 4, the control unit 10 matches the current waveform collected in the device in which the abnormal symptom is detected with the reference model learned and set in the model setting step (S20) to provide the detection result. In this case, the control unit 10 provides the abnormal part of the device corresponding to the most similar reference model to the current waveform of the device as a detection result.

Here, it goes without saying that the control unit 10 may provide a plurality of abnormal parts as the detection result in an order similar to the current waveform of the device.

In addition, the control unit 10 may provide a probability value for the detection result of the abnormal part together to induce the manager to easily determine the abnormal part of the device.

As an example, in the detection step (S30), when the control unit 10 determines that Part A, Part B, and Part C are suspected as the abnormal part as the detection result for the abnormal symptom of the device, the control unit 10 may provide the manager the probability values as Part A—95%, Part B—78%, and Part C—63% together to allow the manager to easily determine the abnormal part.

Such a probability value may be gradually improved as a lot of information is collected in the information collection step (S10) and a period for learning the collected information in the control unit 10 increases.

Further, as illustrated in FIG. 1, the method may further include a relearning step (S40) for receiving, by the control unit 10, feedback on the detection result of the abnormal part regarding the abnormal symptom of the device presented in the detection step (S30) and relearning the detection result and improving the probability value for the detection information presented in the detection step (S30) to enhance the reliability of the detection information.

In other words, as illustrated in FIG. 4, the control unit 10 gradually enhances the reliability of the reference model through the process of receiving feedback on the success or failure of the detection result (detection value) of the abnormal part of the device regarding the abnormal symptom and relearning the detection result. Thus, the excellent reliability for the detection result provided by the control unit 10 may be ensured.

Here, the control unit 10 may also be installed in each device or may be installed in a management server that collectively manages respective devices to provide the learning and detection results as described above.

Meanwhile, before the control unit 10 provides the abnormal part regarding the abnormal symptom of the device as the detection result, of course, the method for detecting the abnormal symptom of the device may be detected by the precision predictive maintenance method of the driving unit, which has been proposed in Korean Patent Registration Nos. 10-1643599, 10-2039742, 10-2039743, 10-1857393, 10-1893745, 10-1893746, and 10-1893744 pre-developed by the present applicant.

Accordingly, when the abnormal symptom of the device is detected by the precision predictive maintenance method of the driving unit pre-developed by the present applicant, the abnormal part of the device is detected, diagnosed, and provided in real time through the method 100 for learning and detecting the abnormal part of the device through artificial intelligence of the present disclosure. Thus, the manager who manages the device may very easily and effectively perform the repair and management of the device.

According to the method 100 for learning and detecting the abnormal part of the device through the artificial intelligence of the present disclosure configured as described above, it is possible to allow a manager to rapidly and accurately determine an abnormal part of the device and effectively deal with an abnormal symptom of the device to induce effective management of the device. The method 100 includes collecting a large amount of information matching faulty part information together with current waveform information before a fault occurs in a plurality of devices. The method 100 also includes constructing and forming, by the control unit 10, a reference model for each faulty part while learning the collected information based on deep learning. The method 100 also includes detecting and providing the abnormal part where the abnormal symptom of the device occurs by comparing the current waveform of the device with the reference model when the abnormal symptom of the device is detected in a real-time driving state.

Further, it is possible to induce stable operation and management of the device by allowing even beginners to easily recognize an abnormal part regarding the abnormal symptom of the device to flexibly cope with the abnormal symptom of the device.

Further, it is possible to strengthen the application versatility of a predictive maintenance method by detecting and providing an abnormal part regarding an abnormal symptom of the device immediately when the abnormal symptom of the device is detected by grafting a technology of a conventional precision predictive maintenance method of a driving unit to supplement an insufficient technical part of the precision predictive maintenance method of the driving unit.

The present disclosure has been described with reference to the embodiment illustrated in the accompanying drawings and is just exemplary. The present disclosure is not limited to the above-described embodiments, but it should be appreciated by those having ordinary skill in the art that various modifications and embodiments equivalent thereto can be made therefrom. In addition, modifications by those having ordinary skill in the art can be made without departing from the scope of the present disclosure. Therefore, the scope of the claims in the present disclosure should not be defined within the scope of the detailed description but should be defined by the following claims and the technical spirit thereof.

What is claimed is:

1. A method for learning and detecting an abnormal part of a device through artificial intelligence, the method comprising:

measuring, by at least one sensor, current values required to drive at least one device so as to form a real-time current waveform, while the current values are changing over time in a real-time driving state of the at least one device;

collecting information about a faulty part of the device, together with current waveform information before a fault occurs in the device;

constructing, by a control unit, a reference model of a current waveform for each faulty part of the device while learning the collected information about the faulty part of the device and the current waveform information before the fault occurs in the device based on deep learning; and in response to a detection of an abnormal symptom of the device in the real-time driving state, comparing, by the control unit, the real-time current waveform of the device and the reference model to immediately determine an abnormal part of the device where the abnormal symptom of the device occurs; and assigning a probability value to the determined abnormal part of the device, wherein the control unit learns an image of a current waveform over time based on the deep learning to construct the reference model of the current waveform for each faulty part of the device, and wherein the collected current waveform information includes at least one information on a current waveform for a driving period in which the device is driven, a time length of the current waveform, an average current of the current waveform, a peak current of the current waveform, and an integral area of the current waveform.

2. The method of claim 1, further comprising:

receiving, by the control unit, feedback on a detection result of the abnormal part where the abnormal symptom of the device occurs; and improving, by the control unit, the probability value assigned to the determined abnormal part of the device by relearning the detection result to enhance a reliability of the determined abnormal part of the device.

* * * * *